Aug. 11, 1931.  E. T. BENNINGTON  1,818,374
OVERHEAD TRAVELING CARRIER
Filed Jan. 15, 1927

INVENTOR:
EARL T. BENNINGTON
BY Kwis Hudson & Kent
ATTORNEYS

Patented Aug. 11, 1931

1,818,374

UNITED STATES PATENT OFFICE

EARL T. BENNINGTON, OF CLEVELAND HEIGHTS, OHIO, ASSIGNOR TO THE CLEVELAND CRANE & ENGINEERING COMPANY, OF WICKLIFFE, OHIO, A CORPORATION OF OHIO

OVERHEAD TRAVELING CARRIER

Application filed January 15, 1927. Serial No. 161,381.

This invention relates to overhead traveling carriers, and more particularly to a motor propelled carrier adapted to travel upon a monorail track system and having flexibly suspended load carrying means.

It is the object of the present invention to provide such a carrier with a simple attachment for preventing swinging movements of the load carrying member during travel of the carrier along the trackway.

Overhead carriers such as above referred to commonly consist of a load supporting section carrying a hoist comprising a cable, a winding drum, and a motor for driving the drum, together with a second section carrying an operator's cab in which are located the controllers for the hoist and for the carrier propelling motor, the sections being flexibly coupled to permit the carrier to readily pass around curves in the trackway. A load carrying hook is commonly suspended by the hoist cable from the load carrying section and this hook may be engaged by a workman on the ground with articles to be lifted and conveyed from one place to another.

It is an object of the present invention to provide a simple attachment for holding the hook against swinging or turning movements so that the hook may be positioned by the operator in the cab to pick up articles from the ground without the assistance of a workman on the ground.

With the above and other objects in view, the invention may be said to comprise the device as illustrated in the accompanying drawings hereinafter described and particularly set forth in the appended claim, together with such variations and modifications thereof as will be apparent to one skilled in the art to which the invention appertains.

Figure 1:
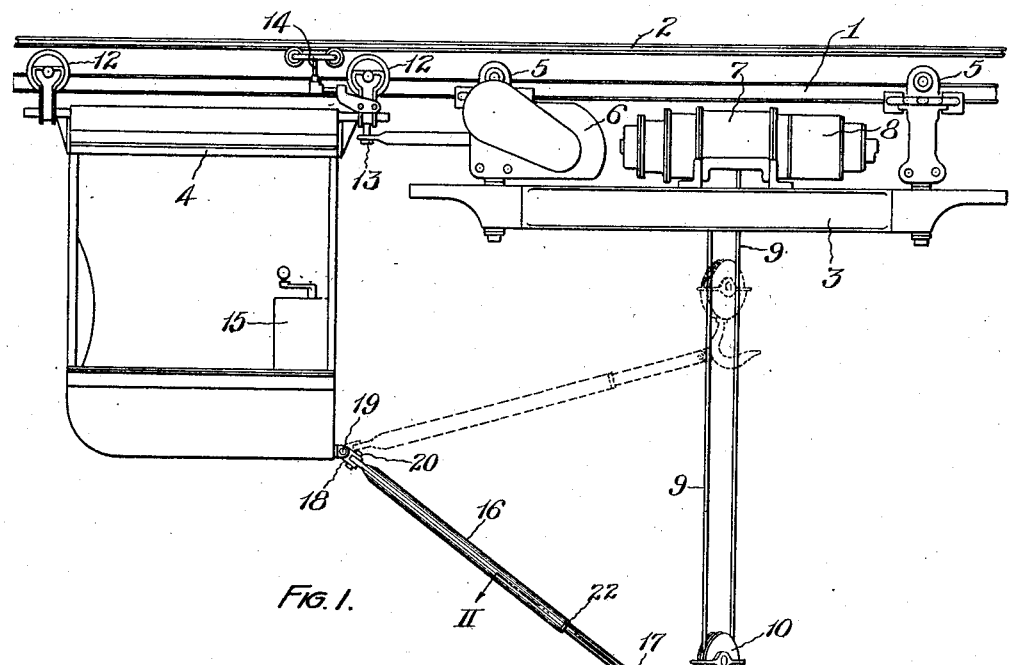
Figure 2:
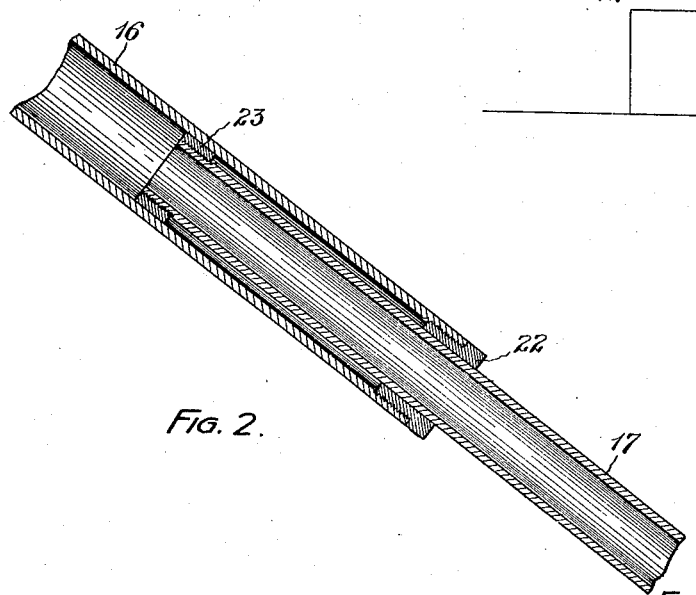

Reference should be had to the accompanying drawings forming a part of this specification, in which:

Fig. 1 is a side elevation of a carrier embodying the invention, showing the load engaging hook in position to engage with an article to be picked up from the ground; and Fig. 2 is an axial section through the telescopic frictional joint between the sections of the steadying arm.

Referring to the accompanying drawings, the overhead track is indicated by the numeral 1, and the conductor rail extending alongside the track is indicated by the numeral 2. The carrier consists of a load carrying section 3 and a cab section 4 in which the operator rides. The load carrying section 3 is provided with supporting wheels 5 which travel upon the track 1, and one set of the supporting wheels 5 is driven by means of a suitable electric motor 6. The load carrying section 3 carries a hoisting drum 7 which is preferably mounted with its axis extending longitudinally of the carrier, the drum being provided with a suitable driving motor 8 and having wound thereon a hoist cable 9 which is anchored at one end to the drum and at the other to the frame of the carrier. In the suspended loop of the cable 9 there is mounted a sheave block 10 to which is secured a load engaging hook 11. The cab section 4 is provided with supporting wheels 12 and is connected to the load carrying section 3 by means of a suitable flexible coupling 13 so that the carrier can readily pass around curves in the track. A suitable conductor arm 14 is carried by the cab section and engages with the conductor rail 2 to supply current to the carrier propelling and hoist operating motors, the operations of these motors being controlled by a suitable controller 15 mounted in the operator's cab.

The carrier so far described is old and well known, the present invention consisting of an attachment by means of which the load engaging hook 11 is prevented from swinging laterally due to the jolting and lateral movements of the carrier in passing along the trackway, and by means of which attachment the hook is prevented from turning about a vertical axis so that the hook may be caused to travel along a straight line and engage with articles on the ground. The hook steadying means consists of an arm formed of two telescopic sections 16 and 17, the section 16 being connected to the lower forward portion of the operator's cab by means of a coupling member 18 which is connected to the cab by a horizontal pivot 19, and to the rear end of the section 16 of the arm by means of a pivot 20, which is disposed at right angles to the pivot 19. The forward end of section 17 of the arm is connected to the back of the hook 11 by means of a horizontal pivot 21. The two sections 16 and 17 have a telescopic frictional connection, the section 17 extending into the section 16 and having sliding engagement in a bushing 22 carried by the arm 16 at the forward end thereof. The section 17 at its rear end has a collar 23 which has sliding fit within the tubular section 16. The bushing 22 and the collar 23 prevent disengagement of the two sections and also provide frictional engagement between the sections imposing a slight resistance to relative endwise movement.

The sheave block 10 and hook 11 supported by the loop of the hoist cable 9 would, if freely suspended, swing in any direction with respect to the carrier, but by reason of the fact that the cable loop normally lies in a plane extending longitudinally of the carrier, there is a minimum resistance to swinging movements of the hook in a lateral direction. The pivot 20 permits the steadying arm to swing laterally with respect to the carrier so that the steadying arm can assume various angular positions while the carrier is traveling around curves, but the movement of this arm about the pivot 20 tends to constrain the hook to an arcuate path of movement different than the path of movement in which the cable exerts its minimum resistance. A swinging movement of the hook in a vertical plane transverse to the carrier would swing the steadying arm about its pivot 20, but in order to permit this lateral movement the steadying arm must be elongated to permit it to follow the normal path of movement of the hook, or the hook must be deflected from its normal path of movement. The added resistance to lateral movement is sufficient to slow down any lateral movements of the hook and to quickly bring the hook to a stop with the cable in vertical position, any oscillatory movements of the hook being dampened so that the hook cannot swing as a pendulum. The horizontal pivot 21 serves to hold the hook in alignment with the steadying arm so that the hook is prevented from turning about its vertical axis and will be held in forwardly extending position. The steadying arm is formed of telescopic sections in order to permit the vertical movements of the hook necessary in hoisting a load, and the steadying arm is connected by the horizontal pivot 19 to the cab to allow it to swing vertically when the hook is raised or lowered. The frictional resistance to relative endwise movement of the sections 16 and 17 is not sufficient to interfere with movement of the section 17 inwardly and outwardly with respect to section 16 as the hook is raised or lowered. While the carrier is traveling along the trackway, the hoist cable is held quite steadily in vertical position, and it is, therefore, possible for the operator in the cab 4 to position the hook so that by propelling the carriage forwardly it may be engaged with an article to be lifted and conveyed by the carrier, as illustrated in Fig. 1, where the hook is shown in a position to engage with the bail 24 of a mold flask 25 resting on the ground.

Having thus described my invention, I claim:

A carrier adapted to travel along an overhead trackway and comprising flexibly coupled sections, hoisting means on one of the sections including a hoist cable, a load engaging hook suspended by said cable, and steadying means connecting the other of said carrier sections and said hook for yieldably resisting lateral swinging movements of said hook, said steadying means comprising an arm composed of telescopic sections yieldingly held against relative endwise movement by frictional engagement with each other, said arm being pivotally connected to the hook and to the carrier section.

In testimony whereof, I hereunto affix my signature.

EARL T. BENNINGTON.